United States Patent [19]
Oricchio

[11] 3,855,347
[45] Dec. 17, 1974

[54] PROCESS FOR HYDROGENATING HALOGENATED HYDROCARBONS

[75] Inventor: F. Frederick Oricchio, Duxbury, Mass.

[73] Assignee: The Badger Company, Inc., Cambridge, Mass.

[22] Filed: Dec. 6, 1973

[21] Appl. No.: 422,405

Related U.S. Application Data

[62] Division of Ser. No. 289,243, Sept. 15, 1972, abandoned.

[52] U.S. Cl........ 260/683.9, 260/676, 260/677 XA, 208/262, 252/441, 252/442, 252/455 R, 252/472
[51] Int. Cl............................................. C07c 1/26
[58] Field of Search........ 252/441, 442, 445 R, 472; 260/683.9, 676, 677 XA; 208/262, 652 P

[56] References Cited
UNITED STATES PATENTS

| | | | |
|---|---|---|---|
| 2,982,803 | 5/1961 | Folkins et al. | 252/441 |
| 2,642,385 | 6/1953 | Berger et al. | 252/441 |
| 2,750,329 | 6/1956 | Barrett et al. | 252/442 |
| 3,004,929 | 10/1961 | Lucas et al. | 252/442 |
| 3,066,176 | 11/1962 | Schwarzenbek | 252/442 |
| 3,089,845 | 5/1963 | Mosely | 252/442 |
| 3,639,226 | 2/1972 | Jacobson et al. | 260/683.9 |
| 2,900,424 | 8/1959 | Frazer | 260/683.9 |
| 2,886,605 | 5/1959 | McClure et al. | 260/683.9 |
| 2,838,577 | 6/1958 | Cook et al. | 260/677 XA |
| 3,268,602 | 8/1966 | Goble et al. | 260/677 XA |
| 3,159,455 | 12/1964 | Skaperdas et al. | 260/677 XA |
| 3,341,615 | 9/1967 | Wulf et al. | 260/677 XA |
| 3,706,724 | 12/1972 | Blanchard et al. | 260/677 XA |
| 2,359,218 | 9/1944 | Hunt et al. | 260/652 P |

Primary Examiner—Paul M. Coughlan, Jr.
Assistant Examiner—Veronica O'Keefe
Attorney, Agent, or Firm—Schiller & Pandiscio

[57] ABSTRACT

An improved process for hydrogenating halogenated hydrocarbons using a novel catalyst is described. The catalyst is made by impregnating silica-alumina particles with a water-hydrogen halide solution of a Group VIII metal halide, drying the particles by heating, and activating the catalyst by fluidizing the particles with a hydrogen-nitrogen gas stream at a temperature between about 550°F and 900°F.

12 Claims, No Drawings

PROCESS FOR HYDROGENATING HALOGENATED HYDROCARBONS

This application is a divisional application of Application Ser. No. 289,243, filed Sept. 15, 1972 now abandoned.

This invention relates to the hydrogenation of halogenated hydrocarbons and more particularly to an improved hydrogenation catalyst.

It is well known that halogenated hydrocarbon wastes from petrochemical plants, e.g., plants for producing vinyl chloride monomer, present a serious disposal problem. Disposal of such wastes by dumping them at sea is frowned upon and incineration is not satisfactory for a number of reasons, including high costs and need for strict stoichiometric control to assure complete conversion to $CO_2$ and water. Accordingly, it has been proposed to hydrogenate such wastes to produce saturated and/or unsaturated hydrocarbons which can be used as feedstocks for petrochemical plants or as a fuel, or separated and sold as commercial chemicals. However, it has been determined that hydrogenation of halogenated hydrocarbon wastes, specifically liquid wastes, cannot be conducted effectively on a commercial plant scale unless it is carried out in a fluid catalyst bed reactor. A fixed catalyst bed reactor has a number of problems, notably the one of poor feed distribution which results in poor yields and extensive coking that necessitates early shutdown. The unsuitability of a fixed catalyst bed reactor is particularly evident when the halogenated hydrocarbon liquid waste feed is highly viscous or rubbery at room temperature due to a relatively large concentration of high boiling compounds or the presence of polymers. A fluid bed facilitates vaporization of "heavies" without fouling of reactor and catalyst surfaces and promotes a uniform distribution of coke formation so as to avoid the high pressure drop caused by coking in fixed bed reactors. Also the hydrogen supplied to the reactor can react with the carbon at a sufficient rate to equilibrate the level of carbon accumulating on the catalyst.

It also has been determined that because of the nature of the liquid halogenated hydrocarbon wastes and the need to avoid extensive coke formation, it is essential that the catalyst have a uniform composition, be free-flowing with good particle size distribution, and possess excellent catalytic activity with high surface area. Furthermore, the catalyst support particles must be free of sintering so as to have mechanical strength adequate to withstand the rigor of fluidization.

It is well known that hydrogenation catalysts consisting of selected metals of known catalytic activity can be prepared by impregnating a support with a solution of a salt of the desired metal, and then reducing the salt in a hydrogen atmosphere at relatively high temperatures, typically 900°–1000°F. However, it also is known that hydrogen reduction often causes sintering of the support material and a severe reduction in the surface area of the support, with a consequent loss of catalyst metal activity. Furthermore, the reduction operation must be prolonged e.g., for several days, and a substantially pure hydrogen atmosphere employed in order to assure that all of the metal salt is reduced.

Accordingly, the one primary object of this invention is to provide an improved catalyst for use in hydrogenating halogenated hydrocarbons. Another primary object is to provide an improved method of producing hydrogenation catalysts.

In accordance with this invention, highly active hydrogenation catalysts capable of withstanding the rigor of fluidization are formed by impregnating free-flowing silica-alumina particles within a selected particle-size range with a hydrogen halide solution of a halide salt of a selected metal, heating the particles to evaporate all water and acid, and then activating the catalyst by placing it in a reactor vessel and fluidizing it in the presence of hydrogen at a temperature of between about 550° and about 900°F.

The metals of catalytic activity applicable to this invention are selected from Group VIII of the Periodic Chart of the Elements. The selected metals are palladium, platinum, rhodium, and nickel. Palladium is the preferred Group VIII noble metal.

These catalyst metals are applied to the support material as a halide salt solution, e.g., a chloride, bromide, etc. Particularly preferred are the chloride salts, e.g., palladium chloride. In the preferred mode of preparing catalysts according to this invention, a catalyst metal chloride is fully dissolved in a hydrochloric acid solution. Then the resulting solution is admixed with silica-alumina support material so that the support is completely wetted by and absorbs the solution. Preferably the support particles are completely inundated by the solution so that the latter fills all of the pores of the former. Excess solution is driven off by heating to a temperature of about 175°F. Then the temperature of the impregnated support is raised to a maximum temperature of about 250°–300°F to evaporate all moisture and dry the catalyst. This removal of excess solution and drying of the catalyst may take from 15–20 minutes to several hours. At most, 4–5 hours of heating is required. When thoroughly dry, the impregnated support is free flowing. Thereafter the impregnated support is placed in a fluid bed reactor and fluidized and activated by passing a hydrogen-nitrogen gas mixture into the bottom of the reactor at a rate such as to provide a velocity through the bed of between 0.2 to 0.5 feet per second. The reactor is kept at a temperature of between 550° and 900°F, preferably about 600°F, during this activation operation which may be continued for several hours up to about 24 hours, preferably for about 10 – 20 hours. Then the catalyst is ready for use. A longer activation period is not required. The hydrogen-nitrogen gas mixture is mostly nitrogen. The latter does not react with the impregnated catalyst support but merely serves to fluidize the catalyst and to dilute the hydrogen for reasons of safety. The hydrogen reduces the metal chloride by reacting therewith to produce hydrogen chloride gas. The ratio of hydrogen to nitrogen is kept within the range of 1:20 to 1:100 on a gram-moles basis.

The silica-alumina support should have a particle size within the range of about 5 to about 175 microns and preferably should have an average particle size between about 30–75 microns. The support material particles should also have a relatively large pore volume, preferably in the order of 0.75 cc/gram, with an average pore size of 30–70 A.

In accordance with this invention, the amount of catalyst metal deposited on the support is at least about 0.2 wt. percent and no more than about 3 wt. percent. More than about 3 wt. percent is allowable but unnecessary since it merely increases the cost of the catalyst and since excellent catalyst activity is achieved with less than about 3 wt. percent. Preferably the catalyst consists of about 2.8 percent metal, with the remainder support material.

Catalysts prepared in accordance with the above description are eminently suitable for fluid bed hydrogenation of liquid, and especially highly viscous, halogenated hydrocarbon wastes, and when so-used they exhibit very high catalytic activity and long life. Furthermore, any coking that occurs is evenly distributed and thus formed carbon can react readily with the hydrogen to minimize the total amount of coking. Of course the same catalysts are useful in promoting the conversion of other organic compounds in admixture with hydrogen, e.g., to hydrogenate unsaturated olefinic, aromatic or acetylenic hydrocarbons such as toluene, butylene, cyclohexene and acetylene. It has been found that fluid bed hydrogenation of halogenated hydrocarbon wastes, e.g., $C_2 - C_8$ halogenated hydrocarbons waste by-products recovered from a vinyl chloride plant, can be effected at moderate temperatures, i.e., in the range of about 500° to 1,200°F at pressures in the range of 0 to 100 psig. using catalysts made as herein described, and that such hydrogenation reactions can be readily controlled to produce saturated and/or unsaturated hydrocarbons which may be disposed of easily by incineration or recovered as useful products.

The invention is further illustrated by the following examples from which no limitations are to be implied over and above those contained in the claims appended thereto, since variations and modifications will be obvious to persons skilled in the art.

EXAMPLE I

Thirteen grams of palladium chloride powder (assay 59 percent Pd minimum), 20 milliliters of reagent grade hydrochloric acid, and 700 milliliters of distilled water were combined and stirred under gentle heat until all of the palladium chloride was dissolved. Then the resulting solution was slowly poured over 600 milliliters of silica alumina ($SiO_2Al_2O_3$) powder in an evaporation dish so that the solution completely inundated the powder support and the latter absorbed all but a small portion of the solution. The silica alumina powder consisted of 86.8% $SiO_2$ and 13.0% $Al_2O_3$, with traces of iron, titanium, magnesium, calcium, rhodium and copper. The silica-alumina particles had a surface area of about 550 $M^2$/gram, a pore volume of 0.77 cc/gram, an average pore size of 50 A, and a bulk density of 0.45 grams/cc. The particle sizes ranged from about 5 to about 175 microns, with about 82 percent of the particles having a size in the range of 30 to 74 microns.

The evaporating dish was then heated to 175°F and held there for about 1 hour. Then the temperature was raised to 375°F, held there for about 3–4 hours, and then cooled. The impregnated powder was now dry and essentially free-flowing, and its color was noticeably darker.

Thereafter the catalyst was passed slowly onto the catalyst retaining grid of a fluid bed reactor that essentially comprised an 8 foot long nickel tube with an inside diameter of about 1 ¼ inches. The reactor was maintained at 600°F while the catalyst was being poured into it and also during the catalyst activation operation. The latter consisted of fluidizing the catalyst with a mixture of nitrogen and hydrogen that was passed into the bottom of the reactor and withdrawing reaction effluent from the top of the reactor. The gas stream consisted of 0.26 gram-moles/hour of hydrogen and 12.0 gram-moles/hour of nitrogen. This activation procedure was continued for 24 hours, after which the flow of gas to the reactor was terminated. The catalyst was now activated and ready for use.

Thereafter a number of different feedstocks were hydrogenated using the same reactor. Examples II and III describe two different runs. In each case hydrogen was supplied to the bottom of the reactor at a rate sufficient to fluidize the catalyst bed and to carry out the desired hydrogenation reaction, and the liquid hydrocarbon feedstock was introduced directly into the catalyst bed. Reaction effluent was recovered from the top end of the reactor.

EXAMPLE II

A chlorinated hydrocarbon waste fraction obtained from the ethylene dichloride purification section of a commercial vinyl chloride monomer plant was employed as the feedstock to be hydrogenated. This feedstock has a composition as set forth in Table I. It was introduced into the reactor at a rate of 44.3 grams per hour and the catalyst bed was fluidizied with hydrogen gas fed in at the rate of 2.0 grams per hour. The reactor was operated at a temperature of about 606°F and substantially atmospheric pressure. The contact time was about 1.11 minutes. The run was continued for 2.8 hours. The reaction effluent was analyzed and was found to have a composition as in Table II.

EXAMPLE III

A second run was made using the same reactor and catalyst but a different waste — chlorinated hydrocarbon fraction from the same vinyl chloride monomer plant. The feedstock composition is given in Table I. The hydrogen feed rate was 8.38 grams/hour and the feedstock rate was 22.04 grams/hour. The reactor pressure was near atmospheric and the catalyst contact time was 0.46 minutes. The reactor temperature was held at about 602°F and the run duration was 3.6 hours. The reaction effluent was analyzed and was found to have a composition as set forth in Table II.

TABLE I

| FEEDSTOCK COMPOSITION IN WT. PERCENT | | |
|---|---|---|
| | Run No. | |
| | No. 1 | No. 2 |
| mono-chlorinated alkyl aliphatics (methyl-, ethyl-, propyl- and butyl chloride) | 5.34 | 0.68 |
| mono-chlorinated olefins (chlorethene, chloropropene and chlorobutene) | 0.00 | 0.84 |
| di-chlorinated alkyl aliphatics | | |
| dichloropropane | 0.00 | 1.03 |
| ethylenedichloride | 34.93 | 42.78 |
| di-chlorinated olefins (dichloroethylene, dichloropropene and dichlorobutene) | 2.97 | 8.72 |
| tri-chlorinated alkyl aliphatics (trichloromethane and trichloroethane) | 28.10 | 29.07 |
| tri-chlorinated olefins (trichloroethylene and trichloropropene) | 0.05 | 0.40 |

TABLE I-Continued

FEEDSTOCK COMPOSITION IN WT. PERCENT

| | Run No. No. 1 | No. 2 |
|---|---|---|
| tetra-chlorinated aliphatics | | |
| tetrachloroethane | 0.00 | 1.87 |
| tetrachloroethylene | 0.00 | 2.23 |
| mono-, di-, and tetra-chlorinated aromatics (chlorobenzene, dichlorobenzene, tetrachlorobenzene and chloroxylene) | 0.00 | 1.85 |
| mono- and di-chlorinated dienes (chloroprene, chloroprene dimer and dichlorocyclohexadiene) | 0.32 | 3.80 |
| Misc. halogenated compounds | | |
| carbon tetrachloride | 28.29 | 4.62 |
| chloroethanol | 0.00 | 0.20 |
| trichloroethanal | 0.00 | 0.20 |
| vinyl bromide | 0.00 | 0.30 |
| bromochloroethane | 0.00 | 0.05 |
| dibromoethane | 0.00 | 0.05 |
| dibromoethylene | 0.00 | 0.02 |
| Other compounds | | |
| benzene | 0.00 | 0.85 |

TABLE II

| | Run No. | |
|---|---|---|
| Product Analysis (Mol %) | No. 1 | No. 2 |
| HCl | 56.06 | 6.09 |
| H$_2$ | 26.90 | 89.64 |
| Ethylene | 0.45 | 0.94 |
| Ethane | 10.08 | 1.90 |
| C$_3$'s & C$_4$'s | 0.58 | 0.93 |
| Methane | 4.31 | — |
| Chlorinated Hydrocarbons | 1.44 | 0.50 |

It is apparent from the foregoing examples that the reaction effluents were substantially free of chlorinated hydrocarbons.

Catalysts made in accordance with this invention also are suitable for hydrogenation of halogenated hydrocarbons comprising bromide, fluorine and/or iodine in place of or in addition to chlorine.

It is to be noted also that the catalyst activation operation may be modified by using some other inert gas in place of nitrogen to effect fluidization.

What is claimed is:

1. A process for hydrogenating halogenated hydrocarbons by contacting the same, in admixture with hydrogen and under hydrogenation conditions, with a catalyst, the preparation of which comprises (1) impregnating the particles of a silica-alumina powder with a hydrogen halide acid - water solution of a Group VIII metal halide, (2) heating the resulting particles to a temperature between about 175° and 300°F for a period sufficient to evaporate excess solution and dry said particles, placing said dried particles in a reactor so as to form a bed and (3) activating said dried particles by fluidizing said bed with a gas stream that comprises hydrogen and an inert gas at a temperature between about 550° and 900°F, for a period sufficient to reduce the metal halide on said dried particles.

2. A process according to claim 1 wherein said metal constituent of said metal halide is selected from the group consisting of palladium, platinum, rhodium and nickel.

3. A process according to claim 2 wherein said metal constituent is palladium.

4. A process according to claim 1 wherein said hydrogen halide acid and said metal halide have the same halide constituent.

5. A process according to claim 4 wherein said halide constituent is chlorine.

6. A process according to claim 1 wherein said hydrogenation is effected at a temperature in the range of about 500° to 1200°F.

7. A process according to claim 6 wherein said hydrogenation is effected at a pressure in the range of about 0 to 100 psig.

8. A process according to claim 1 wherein said catalyst is fluidized during said contacting under hydrogenation conditions.

9. A method according to claim 1 wherein said silica-alumina powder is SiO$_2$Al$_2$O$_3$.

10. A method according to claim 1 wherein the ratio of hydrogen to nitrogen in said gas stream is within the range of 1:20 to 1:100 on a gram-moles basis.

11. A method according to claim 10 wherein said gas stream passes through said dried powder at a velocity of between 0.2 and 0.5 feet per second.

12. A method according to claim 1 wherein said catalyst comprises up to about 3 percent by weight of palladium.

* * * * *